(12) United States Patent
Friedlaender

(10) Patent No.: US 9,126,354 B2
(45) Date of Patent: Sep. 8, 2015

(54) METHOD AND DEVICE FOR RECYCLING LABELED PLASTIC ARTICLES

(71) Applicant: KRONES AG, Neutraubling (DE)

(72) Inventor: Thomas Friedlaender, Neutraumbling (DE)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 14/011,486

(22) Filed: Aug. 27, 2013

(65) Prior Publication Data

US 2014/0060747 A1 Mar. 6, 2014

(30) Foreign Application Priority Data

Sep. 5, 2012 (DE) .......................... 10 2012 215 752

(51) Int. Cl.
| | | |
|---|---|---|
| B32B 38/10 | (2006.01) | |
| B29B 17/02 | (2006.01) | |
| B08B 9/08 | (2006.01) | |
| B32B 43/00 | (2006.01) | |
| B29L 31/00 | (2006.01) | |
| B29K 67/00 | (2006.01) | |

(52) U.S. Cl.
CPC ................. *B29B 17/02* (2013.01); *B08B 9/083* (2013.01); *B29B 2017/0217* (2013.01); *B29B 2017/0279* (2013.01); *B29K 2067/003* (2013.01); *B29L 2031/7158* (2013.01); *B29L 2031/744* (2013.01); *B32B 38/10* (2013.01); *B32B 43/006* (2013.01); *Y02W 30/622* (2015.05); *Y10T 156/11* (2015.01); *Y10T 156/19* (2015.01)

(58) Field of Classification Search
CPC ...... B32B 38/10; B32B 43/006; B29B 17/02; B29B 2017/0217

USPC .................... 241/14; 29/426.3, 426.4; 83/27
See application file for complete search history.

(56) References Cited

U.S. PATENT DOCUMENTS

| | | | |
|---|---|---|---|
| 4,830,699 A | | 5/1989 | Burlet et al. |
| 4,956,033 A | * | 9/1990 | Martin et al. ................... 156/94 |
| 5,513,807 A | * | 5/1996 | Stricker ......................... 241/23 |
| 6,153,042 A | * | 11/2000 | Tominaga ..................... 156/709 |
| 6,199,615 B1 | * | 3/2001 | Klarl .............................. 156/750 |
| 6,680,097 B1 | * | 1/2004 | Amberger et al. ........... 428/40.1 |
| 2003/0070754 A1 | * | 4/2003 | Francis et al. ................ 156/344 |
| 2007/0187035 A1 | * | 8/2007 | To et al. ........................ 156/344 |

FOREIGN PATENT DOCUMENTS

| | | |
|---|---|---|
| CN | 1765602 A | 5/2006 |
| DE | 10308500 A1 | 9/2004 |
| JP | 2006035060 A | 2/2006 |
| KR | 19990084227 A | 12/1999 |

OTHER PUBLICATIONS

European Search Report for Application No. 13180318 dated Dec. 12, 2013.

* cited by examiner

*Primary Examiner* — Philip Tucker
*Assistant Examiner* — Nickolas Harm
(74) *Attorney, Agent, or Firm* — Marshall, Gerstein & Borun LLP

(57) ABSTRACT

A method and a device for recycling labeled plastic articles are described. Accordingly, the labels are detached from the plastic articles and the plastic articles treated in this way are sorted in particular automatically. During sorting, plastic articles from which the labels have not been properly detached are sorted out and again subjected to the treatment for detaching the labels.

7 Claims, 2 Drawing Sheets

METHOD AND DEVICE FOR RECYCLING LABELED PLASTIC ARTICLES

FIELD OF THE DISCLOSURE

This disclosure relates to a method and to a device for recycling of labeled plastic articles and, more particularly, for processing of articles in a manner that involves separation of articles, such as bottles, from which labels have not been completely removed from articles from which labels have been fully removed.

BACKGROUND

Plastic articles, in particular plastic beverage bottles, for example of PET, are increasingly provided with plastic labels. When such plastic articles are recycled, these labels must be preferably completely removed, just as conventional paper labels. Otherwise, etchants that are employed, for example, in washing processes, will cause an undesired introduction of color into the respective washing medium and into the washed plastic.

The removal of the labels by means of wet processes, for example in washing of complete bottles, is not sufficiently effective in particular in case of plastic labels. By dry methods, for example by means of cutting tools, the labels can neither be reliably removed to the desired degree, so that time-consuming manual sorting of the articles is normally required before the latter are subsequently crushed. The sorted-out articles are then usually disposed of or can only be used for processes of inferior quality.

There is thus a problem in conventional methods and devices in that either a very high number of personnel must be employed for sorting the articles again to obtain a fraction for subsequent crushing that is sufficiently homogenous as to type and color, or in that the usually colored labels remain in the material to be crushed in such a high amount that an undesired coloration of the recycled material cannot be avoided. This is particularly disadvantageous in case of clear plastics, in particular with clear PET for the packaging of food. It is moreover desirable to optimize the efficiency of the recycling of labeled articles.

There is thus a demand for methods and devices for recycling plastic articles, in particular widely used PET beverage bottles, which methods and devices are improved in this respect.

SUMMARY OF THE DISCLOSURE

According to methods and devices of the present disclosure, labels are detached from plastic articles in a first treatment step, and subsequently sorted, in particular by machines, in a second treatment step. During the sorting process, those plastic articles from which the labels have not been properly removed in the first treatment step are sorted out. Furthermore, the plastic articles sorted out in this way are again fed to the first treatment step.

The plastic articles with not properly removed labels can be detected by machines and/or manually and subsequently sorted out from the article stream by machines and/or manually and returned to subsequently crush the plastic articles. Thereby, the effectiveness and efficiency of label removal can be increased.

Mechanical and manual steps can be combined in the detection and/or sorting process. For example, manual sorting could follow mechanical pre-sorting. Sorting steps following label removal can be arbitrarily combined to return the respectively sorted-out plastic articles with not properly removed labels to label removal according to the present disclosure. Labels in the sense of the present disclosure can include, for example, plastic, paper, metal foils or composite materials of these material classes. The labels can be, for example, glued and/or shrunk onto the plastic articles, or adhere to them by elastic frictional engagement. For example, those plastic articles where a suited given criterion is fulfilled can be defined as not being proper, where, for example, a certain label color is detected, a maximally admissible residual size of the label is determined, or the like.

The return of the sorted-out plastic articles can include an intermediate storage in an article buffer or be done directly, for example by means of a conveyor belt or the like. Plastic labels that have not been properly removed can repeatedly pass through such a return loop, in particular until the labels have been removed to a given degree, in the sense of properly.

Preferably, the plastic articles sorted out in this way are added to untreated plastic articles before they are subjected again to the first treatment step. Untreated plastic articles in the sense of the present disclosure are those articles before the first label removal. Thus, a return loop can be provided in a simple manner where the plastic articles are also returned to the beginning of the first treatment step several times, if required. By adding the sorted-out plastic articles, essentially constant plant operation can moreover be ensured because the sorted-out plastic articles and the untreated plastic articles can be fed to the first and the second treatment steps in a similar way, both as a continuous, mixed article stream and as a mixed batch. However, it would also be possible to collect the sorted-out plastic articles separately and to treat them again as a separate article batch. Untreated and sorted-out plastic articles would then be processed, for example, alternately in batches or as parallel article streams or article batches.

Preferably, the sorted-out plastic articles are intermediately stored before the first treatment step together with untreated plastic articles. For this, conventional article buffers can be used in which the plastic articles which are supplied, for example, at irregular intervals, are intermediately stored after they have been taken off a collective pack, bale or the like, and before the labels are removed. An additional article buffer for the sorted-out plastic articles is then dispensable. An additional article buffer, however, would be also possible in particular in connection with a parallel treatment step for detaching the labels at the plastic articles with not properly removed labels. A so-called concentration increase of not properly removed labels in the primary material stream before the first treatment step can thus be reduced or avoided.

Preferably, the labels are mechanically detached from the plastic articles. For this, preferably cutting and/or abrasive tools are used, for example knives. The mechanical removal of the labels is preferably accomplished as a dry process where in particular no etchants are employed for detaching the labels. Thereby, an undesired introduction of color from the labels into the plastic articles can be avoided. A wet detachment of the labels, however, would also be possible.

Preferably, the plastic articles are sorted in a non-crushed condition in the second treatment step. Sorting can then be performed mechanically in a conventional sorter for complete bottles, in a suitably modified sorter for complete bottles, or the like. In the latter, article fractions with certain colorings and/or foreign matter fractions and/or article fractions of certain materials, for example metal, are separated from the plastic articles to be crushed in a well-known manner. In other words, the label removal and sorting according to the present disclosure can be carried out with machines which are anyway advantageous for recycling plastic articles, in particular PET beverage bottles. If required, these machines must be only suitably modified for detecting the labels or label residues. Thus, the required personnel for the manual re-sorting process before the plastic articles are crushed can be clearly reduced without increasing the required amount of apparatuses to the same degree.

Preferably, not properly removed labels are detected by their material and/or their color and/or their transparency and/or their position on the plastic articles and/or their shaping. Thus, criteria for detecting the not properly removed labels which are employed in conventional sorters, and/or which can be implemented in conventional sorters, can be used. For example, the detection of the labels by a certain coloring is particularly suited for plastic labels whose material properties only slightly differ from those of the plastic articles, for example the PET bottles. Detection by certain materials is, for example, suited for metal-containing foil labels or the like. Detection of the labels by their transparency is, for example, particularly suited for clear beverage bottles or the like. Since the labels visually often clearly differ from the plastic articles as to their intention, optical, for example imaging, detection methods can be particularly advantageously employed for sorting out the plastic articles with not properly removed labels.

The method according to the present disclosure preferably furthermore comprises a third treatment step in which plastic articles not sorted out in the second treatment step are crushed. Thereby, plastic flakes with a low proportion of contaminations and/or discolorations by label residues can be generated. In particular, the efforts for manual post-sorting optionally inserted before the crushing process can be considerably reduced.

Preferably, the plastic articles are used PET beverage bottles. Such bottles occur in particularly high amounts and are therefore of particular interest for recycling. Moreover, for reusing the recycled plastic material in the food industry, particularly high demands on the purity of the recycled material must be met. This can be particularly efficiently ensured with the method according to the present disclosure.

The set object is furthermore achieved with a device according to claim 9. Accordingly, the latter comprises a label removal unit for mechanically detaching labels from the plastic articles and a sorting unit for sorting the plastic articles in particular mechanically. In particular, the sorting device is embodied for mechanically detecting and sorting out those plastic articles from which the labels have not been properly removed. Furthermore, an article buffer for intermediately storing the plastic articles sorted out in this manner, and/or a transport means for returning the thus sorted-out plastic articles to the label removal unit is/are provided.

The function according to the present disclosure for detecting and sorting out plastic articles with not properly removed labels can be realized in a comparably simple way in conventional sorters. Article buffers and/or transport means for plastic articles sorted out in this manner can be moreover easily integrated in recycling plants for plastic articles, in particular also in already existing plants. Transport means according to the present disclosure are, for example, stationary transport lines, such as conveyor belts or the like, but also transport vehicles. Article buffers according to the present disclosure can be embodied to be stationary and/or located on transport vehicles.

Thus, the effectiveness and efficiency of label removal can be increased, in particular with simultaneously clearly reduced efforts for the manual re-sorting of the plastic articles. The label removal unit preferably operates in a dry process by mechanically detaching the labels from the plastic containers, for example by means of suited abrasive and/or cutting tools.

Preferably, a common article buffer for the sorted-out plastic articles and for untreated plastic articles is provided upstream of the label removal unit. In other words, the sorted-out plastic articles are preferably transported to an article buffer for incoming plastic articles which is anyway present in conventional recycling plants. Here, the sorted-out plastic articles can be transported back from the sorting device to the article buffer in batches or continuously. Thus, a continuously operated conveyor belt or the like can be provided, or else a transport means, for example a vehicle, by means of which a certain amount of the sorted-out plastic articles is collected and transported to the common article buffer. Firmly installed circulating transport means, such as conveyor belts or the like, are advantageous for continuous plant operation, independent of whether the transport means are operated continuously or in indexed operation.

Preferably, a separation unit for discarding a fraction with labels detached from the plastic articles is furthermore provided between the label removal unit and the sorting unit. Such separation units can operate, for example, according to the centrifugal principle, for example cyclones or the like. Thereby, the light detached labels can be separated from the comparably heavy uncrushed articles. Consequently, only plastic articles without labels and plastic articles with not properly removed labels are preferably fed to the sorting unit, not, however, the labels that have been previously detached in the label removal unit. This is particularly advantageous in the sense of the present disclosure since the labels must be detected while previously not properly treated plastic articles are being sorted out, where detached labels that are still present disturb the process.

Preferably, a crusher for crushing the sorted plastic articles is furthermore provided downstream of the sorting device. Thereby, plastic articles without labels or label residues can be selectively processed into plastic flakes, in particular PET flakes.

Between the sorting device and the crusher, sorting stations known from prior art could be inserted, for example for manually re-sorting the plastic articles and/or mechanically sorting-out metals.

Preferably, the sorting device is designed for mechanically sorting out at least one further fraction of components of the plastic articles and/or foreign matters. Thereby, a compact sorting station can be provided.

Preferably, the sorting device is designed for selectively inspecting a predetermined region of the plastic articles where the labels are provided. For example, labels and label residues could be particularly reliably detected by imaging.

A preferred embodiment of the invention is represented in the drawing, wherein:

DETAILED DESCRIPTION OF THE PREFERRED EMBODIMENTS

Figure 1:
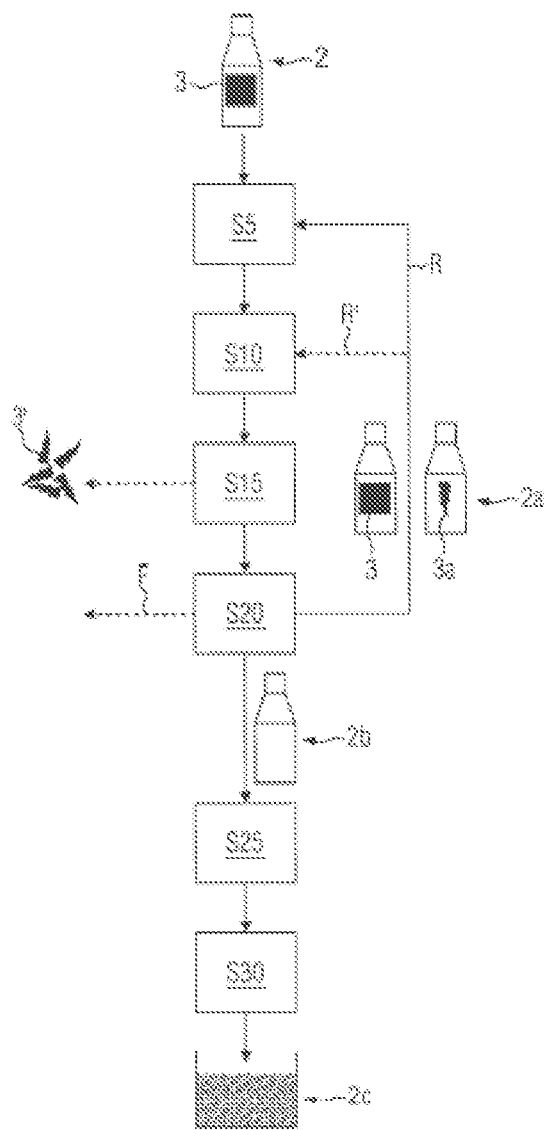
FIG. 1 shows a flow chart of the method according to the present disclosure.

As can be seen in FIG. 1, the method according to the present disclosure for recycling labeled plastic articles 2, for example beverage bottles, includes at least one first treatment step S10 for detaching labels 3 provided at the plastic articles 2, and a subsequent second treatment step S20 wherein plastic articles 2a from which the labels 3 have not been properly removed are sorted out. The plastic articles 2 are in particular used plastic containers, for example beverage bottles, in particular PET beverage bottles.

According to the present disclosure, the sorted-out plastic articles 2a are again fed to the first treatment step S10 on a return loop R, R'. Here, variant R is particularly advantageous where the sorted-out plastic articles 2a are added to untreated plastic articles 2 upstream of the first treatment step S10 in an optional procedure step S5 to feed the plastic articles 2, 2a together to the first treatment step S10. The adding of the sorted-out plastic articles 2a can be realized, for example, by common intermediate storage of the untreated plastic articles 2 and the sorted-out plastic articles 2a, or by joining them on a conveyor belt or the like on the inlet side. The untreated plastic articles 2 are, according to definition, those which are subjected to label removal for the first time.

In FIG. 1, further optional treatment steps are represented, which are an intermediate step S15 for discarding the labels or label residues 3' detached in the first treatment step S10, a further intermediate step S25 for manually re-sorting the plastic articles 2b not sorted out in the second treatment step S20, and a third treatment step S30 for crushing the not sorted-out plastic articles 2b to obtain plastic flakes 2c or the like from them for subsequent recycling processes of the plastic articles 2. These can include, for example, washing, decontamination and solid-phase condensation of the plastic flakes 2c.

The intermediate step S25 could also be replaced or supplemented by automatic re-sorting, or it could be dispensable altogether, depending on the quality and composition of the plastic articles 2 to be recycled and the labels 3 to be detached. The latter can consist, for example, of paper or plastic. The labels 3 could be fixed to the plastic articles 2 by gluing and/or shrinking on. They could equally be stretch sleeves, that means elastic plastic tubes or hoses, which are put over the plastic articles 2 in an extended state and adhere to them essentially by friction.

Correspondingly, in the first treatment step S10, different mechanical methods for detaching the labels 3 can be used. A mechanical detachment of the labels 3 is particularly suited for high-quality recycling. For example, cutting tools are particularly suited for foil sleeves that adhere to the article only by friction. Glued-on labels 3 could optionally be particularly effectively removed with other, abrasive tools. The first treatment step S10 is preferably a dry process wherein the labels 3 are detached without using solvents, in particular without using etchants. The method according to the invention, however, is not restricted to the use of dry processes for detaching the labels 3. The labels 3 can thus be detached and disposed of by means of methods known per se.

In the second treatment step S20, the uncrushed plastic articles 2 are inspected, for example by means of optical and/or magnetic and/or electrostatic methods, and plastic articles 2a with not properly removed labels 3 or label residues 3a are preferably sorted out by machines. In addition to the second treatment step S20, fractions F present in the article stream and determined in a conventional way can be additionally discarded. Such fractions F can be, for example, article fractions of certain colors, article fractions of certain materials, for example metals, and/or fractions with foreign matters possibly not specified more in detail. Thus, a configuration where the second treatment step S20 is combined with a mechanical article sorting in a common sorting station that is anyway usual for the recycling of plastic articles is particularly advantageous.

In general, however, the second treatment step S20 can also be carried out exclusively manually or as a combination of automatic and manual partial steps. For example, mechanical detection and sorting-out processes could be supplemented by directly following manual detection and sorting-out processes. The sorted-out plastic articles 2a could then be returned together, independent of whether they have been sorted out by machines or manually. The sorted-out plastic articles 2a are returned in a non-crushed state for removing the labels again. In a non-crushed state, they can be repeatedly subjected to the same treatment steps, if required, without changing the handling of the plastic articles 2, 2a.

Further conventional treatment steps for isolating the plastic articles 2 from supplied bales or the like, for example in a so-called debaler, and for the ballistic separation of differently shaped article fractions, differently fine article fractions or the like before the removal of the labels 3, are not represented in FIG. 1. Moreover, further sorting steps can be inserted, for example the sorting out of metallic material components. Such methods are generally known from prior art and can be arbitrarily integrated in the method according to the present disclosure.

Thus, the plastic articles 2 indicated at the inlet side in FIG. 1 can be already suitably presorted by a ballistic separator. The method according to the invention is particularly advantageous for the recycling of PET beverage bottles which are fed to the step S5 on the inlet side and/or the first treatment step S10 in an already suitably collected and/or presorted state. Here, the plastic articles 2 can be fed as continuous article stream as well as in batches.

Figure 2:
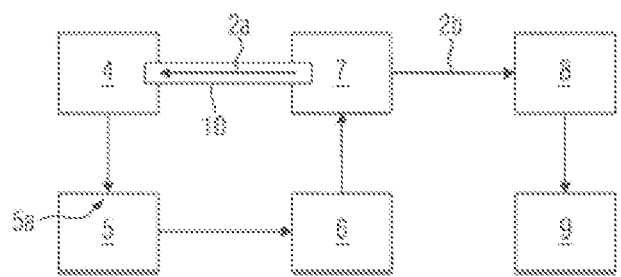
FIG. 2 shows a block diagram of a device according to the present disclosure.

As can be seen in FIG. 2, a preferred embodiment 1 of the device according to the invention for recycling the used plastic articles 2 comprises an article buffer 4 for intermediately storing supplied plastic articles 2 that optionally have been suitably isolated, a label removal unit 5, a separator unit 6 for discarding detached labels 3, a sorting device 7 for sorting out the plastic articles 2a with not properly removed labels 3 or label residues 3a, a re-sorting station 8 for manually re-sorting the plastic articles 2b not sorted out in the sorting device 7, and a crusher 9 for crushing the not sorted-out plastic articles 2b, for example for manufacturing plastic flakes.

Furthermore, a transport line 10 connecting the sorting device 7 with the article buffer 4 for returning the plastic articles 2a sorted out in the sorting device 7 corresponding to the return loop R via the article buffer 4 to the label removal unit 5 is indicated schematically. As an alternative, the transport line 10 could also return the sorted-out plastic articles 2a corresponding to the return loop R' directly to an article inlet 5a of the label removal unit 5. The transport line 10 consists, for example, of a conveyor belt or the like. Individual vehicles (not represented) by means of which a suited amount of the sorted-out plastic articles 2a could be respectively fed to the article buffer 4 or the article inlet 5a of the label removal unit 5 in batches would also be conceivable. In the article buffer 4, the sorted-out plastic articles 2a are preferably mixed with untreated and suitably presorted and/or isolated plastic articles 2.

The sorting device 7 is preferably designed such that it cannot only mechanically detect not properly removed labels 3 or label residues 3a and mechanically discard the corresponding plastic articles 2a, but also fulfills at least one further sorting job, such as for example the sorting out of article components and foreign matters depending on their coloring, transparency, material, shape, electrostatic charge and magnetic properties. Thus, the sorting function according to the present disclosure is preferably integrated in a sorter known per se. The sorting function according to the present disclosure could be supplemented, for example, in the inlet area or in the outlet area of already existing sorters. However, a separate sorting device 7 only for discarding the not properly treated plastic articles 2a would also be conceivable. Equally, the sorting device 7 could comprise or be a conventional sorting station for manual sorting out.

An advantage of the method according to the present disclosure and the corresponding device is the comparably simple implementation of the return loop R, R' according to the present disclosure in plants with treatment stations known per se, optionally also a subsequent implementation of the return loop R, R'. Consequently, with comparably little efforts as to the apparatuses, a mechanical sorting-out of not correctly treated plastic articles can be realized and the purity of the sorted article stream increased. The otherwise considerably high amount of required personnel for manual re-sorting before the plastic articles are crushed can also be reduced.

The invention claimed is:

1. Method of recycling labeled plastic containers, with a first step of providing the containers, with a subsequent second step in which labels are mechanically detached from the plastic containers and with a third step in which the plastic containers treated in the second step are mechanically sorted,
   wherein, in the third step, plastic containers from which the labels have not been properly detached in the second step are sorted out, and the plastic containers sorted out in this way are returned to the first step,
   wherein not properly detached labels are detected by at least one of a predetermined material, coloring, transparency, position on the plastic containers, or shape, and
   wherein in the first step, the sorted-out plastic containers are added to plastic containers that have not yet undergone the second step.

2. Method according to claim 1, wherein in the first step, the sorted-out plastic containers are intermediately stored together with plastic containers that have not yet undergone the second step.

3. Method according to claim 1, wherein the plastic containers are sorted in the third step in a non-crushed state.

4. Method according to claim 1, further including a fourth step in which plastic containers not sorted-out in the third step are crushed.

5. Method according to claim 1, wherein the plastic containers are post-consumer PET bottles.

6. Method according to claim 1, wherein in sorting the plastic containers from which the labels have not been properly detached in the second step, the sorting is mechanically performed in a sorting device that further automatically sorts out at least one further fraction, including at least one of components of the plastic containers and foreign matters.

7. Method according to claim 1, wherein in sorting the plastic containers from which the labels have not been properly detached in the second step, the sorting is mechanically performed in a sorting device that further selectively inspects a predetermined region of the plastic containers in which the labels are provided.

* * * * *